United States Patent
Binette et al.

(10) Patent No.: US 9,427,629 B1
(45) Date of Patent: Aug. 30, 2016

(54) GOLF BALL INCORPORATING A THIN MOISTURE BARRIER LAYER

(71) Applicant: Acushnet Company, Fairhaven, MA (US)

(72) Inventors: Mark L. Binette, Mattapoisett, MA (US); John D. Farrell, Providence, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/668,009

(22) Filed: Mar. 25, 2015

(51) Int. Cl.
A63B 37/00 (2006.01)

(52) U.S. Cl.
CPC ....... *A63B 37/0045* (2013.01); *A63B 37/0003* (2013.01); *A63B 37/0022* (2013.01); *A63B 37/0039* (2013.01); *A63B 37/0048* (2013.01); *A63B 37/0093* (2013.01)

(58) Field of Classification Search
CPC .......... C08J 3/05; C08J 2333/08; C08F 8/44; C08F 210/02; A63B 37/0003; A63B 37/0093
See application file for complete search history.

(56) References Cited

U.S. PATENT DOCUMENTS

| | | | |
|---|---|---|---|
| 5,820,488 A | 10/1998 | Sullivan et al. | |
| 5,885,172 A | 3/1999 | Hebert et al. | |
| 6,132,324 A | 10/2000 | Hebert et al. | |
| 6,232,389 B1 | 5/2001 | Feeney et al. | |
| 6,398,668 B1 | 6/2002 | Wai | |
| 6,632,147 B2 | 10/2003 | Cavallaro et al. | |
| 6,838,028 B2 | 1/2005 | Hogge et al. | |
| 6,852,043 B2 * | 2/2005 | Sullivan ............. | A63B 37/0003 473/374 |
| 6,932,720 B2 | 8/2005 | Hogge et al. | |
| 7,004,854 B2 | 2/2006 | Hogge et al. | |
| 7,004,855 B2 | 2/2006 | Jordan | |
| 7,063,630 B2 * | 6/2006 | Cavallaro .......... | A63B 37/0003 473/374 |
| 7,182,702 B2 | 2/2007 | Hogge et al. | |
| 7,306,528 B2 | 12/2007 | Jordan | |
| 7,357,733 B2 | 4/2008 | Hogge et al. | |
| 8,303,436 B2 | 11/2012 | Sullivan et al. | |
| 8,454,455 B2 | 6/2013 | Cavallaro | |
| 8,907,022 B2 * | 12/2014 | Hayes ........................ | C08J 3/05 524/562 |
| 2003/0069082 A1 | 4/2003 | Sullivan | |
| 2003/0069085 A1 | 4/2003 | Hogge et al. | |
| 2003/0130062 A1 | 7/2003 | Morgan et al. | |
| 2004/0147344 A1 | 7/2004 | Sullivan et al. | |
| 2004/0185963 A1 | 9/2004 | Hogge et al. | |
| 2006/0068938 A1 | 3/2006 | Sullivan | |
| 2006/0128505 A1 * | 6/2006 | Sullivan ............. | A63B 37/0003 473/371 |
| 2007/0129172 A1 | 6/2007 | Cavallaro | |
| 2008/0064528 A1 * | 3/2008 | Jordan ............... | A63B 37/0003 473/374 |
| 2008/0261721 A1 | 10/2008 | Hogge et al. | |
| 2009/0169741 A1 * | 7/2009 | Hogge ................. | A63B 37/005 427/241 |

\* cited by examiner

*Primary Examiner* — John E Simms, Jr.
(74) *Attorney, Agent, or Firm* — Margaret C. Barker

(57) ABSTRACT

Golf ball comprising a first layer having a first spherical outer surface; a thin moisture vapor barrier layer disposed concentrically about the first spherical outer surface and having a thickness of less than about 0.010 inches; and a second layer disposed concentrically about a second spherical outer surface of the thin moisture vapor barrier layer. The thin moisture vapor barrier layer is formed from an ionomer composition consisting of a 1-50 percent aqueous monovalent high acid ionomer dispersion, with the ionomer: having an acid level greater than 18%; having more than 45% of acid groups that are neutralized with a monovalent cation; and being formed from an acid copolymer having a starting melt index of greater than 180 g/10 min.@190° C. with a 2160 g load. The moisture vapor barrier layer has a moisture vapor transmission rate that is lower than that of at least one of the first layer and/or the second layer.

10 Claims, No Drawings

GOLF BALL INCORPORATING A THIN MOISTURE BARRIER LAYER

FIELD OF THE INVENTION

Golf balls incorporating at least one very thin moisture vapor barrier layer, and methods of making such golf balls.

BACKGROUND OF THE INVENTION

Golf balls are made in a variety of constructions and compositions. Generally, a core is surrounded by a cover, with at least one intermediate layer optionally disposed there between. Golf ball manufacturers continuously experiment with constructions and material formulations in order to target and improve aerodynamic and/or inertial properties and achieve desired feel without sacrificing durability.

Examples of golf ball materials range from balata to polybutadiene, ionomer resins, polyurethanes, and/or polyureas. Typically, outer layers are formed about the spherical outer surface of an inner golf ball component via compression molding, casting, or injection molding.

A known problem with golf balls is that water vapor sometimes penetrates into golf ball materials, which can harmfully affect golf ball properties. For example, when a polybutadiene core cross-linked with peroxide and/or zinc diacrylate absorbs water, the core tends to lose resiliency, and the compression and coefficient of restitution (COR) of the ball may change.

The industry has addressed this problem by applying a moisture barrier layer over a golf ball material that would otherwise be vulnerable to water penetration. In this regard, an effective moisture barrier layer has a water vapor transmission rate that is low enough to create a barrier against moisture penetration into the enveloped material and thereby protect the material against the negative effects of water.

Additionally, a moisture barrier layer is ideally as thin as possible in order to maximize its effectiveness in resisting moisture without compromising golf ball properties such as COR, durability, and compression or unnecessarily increasing the cost of materials and processing.

Some prior thin moisture barrier layers involve nanocomposite filled elastomeric coatings containing exfoliated platelet particles or a specialized low transmission polymer such as polyvinylidene chloride. However, these materials are known to display inter-layer adhesion problems, durability issues, and resilience deficiency. In fact, loss of barrier effectiveness sometimes occurs when the moisture barrier layer cracks upon the golf ball's impact with a club. Meanwhile, golf balls incorporating non-ionomeric polyolefin materials in thin moisture barrier layers of about 0.010 inches or less are also disclosed. See, e.g., U.S. Pat. No. 8,303,436 of Sullivan et al.

However, ionomeric materials are often preferred in many constructions due to their superior durability and desirable performance characteristics such as scuff resistance and rebound. Also being known to be non-soluble in water, ionomers would therefore serve as excellent moisture vapor barrier materials. But golf ball manufacturers have encountered difficulties in applying ionomeric materials in desirably thin layers. In this regard, ionomers generally require high pressures and temperatures to form a layer via typical processes like RPIM or compression molding, thereby making layers under 0.030 inches difficult to mold unless included in blends with non-ionomeric compositions such as polyvinyl alcohol copolymer and polyamides.

Accordingly, there is a need for golf balls incorporating thin ionomeric moisture vapor barrier layers of about 0.010 inches or less without using the solvents, pressure vessels or intensive mechanical agitation necessary to incorporate ionomers into golf ball layers having conventional thicknesses. Such a golf ball would permit golf ball manufacturers to cost effectively capitalize on the superior hydrophobic qualities of ionomers, which already have a great track record for durability and performance. The present invention provides golf balls and methods that address and solve this need.

SUMMARY OF THE INVENTION

Therefore, in one embodiment, a golf ball of the invention comprises: a first layer; a thin moisture vapor barrier layer having a thickness of less than about 0.010 in. and disposed concentrically about a spherical outer surface of the first layer; and a second layer disposed concentrically about a spherical outer surface of the thin moisture vapor barrier layer. The thin moisture vapor barrier layer is formed from an ionomer composition consisting of a 1-50 percent aqueous mono-valent high acid ionomer dispersion. The ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load. The moisture vapor barrier layer has a moisture vapor transmission rate that is lower than at least one of a moisture vapor transmission rate of the first layer or a moisture vapor transmission rate of the second layer.

In one construction, the first layer comprises a core, the thin moisture vapor barrier layer comprises an inner cover layer, and the second layer comprises an outer cover layer. In this embodiment, the core may for example comprise polybutadiene while the second layer comprises a polyurethane composition.

In another construction, the first layer comprises an inner cover layer, the thin moisture vapor barrier layer comprises a second inner cover layer, and the second layer comprises an outer cover layer. In this embodiment, the inner cover layer comprises an ionomeric composition different than that of the thin moisture vapor barrier layer, and the outer cover layer comprises a polyurethane composition.

In one embodiment, the moisture vapor barrier layer has a moisture vapor transmission rate that is lower than that of the first layer. In another embodiment, the moisture vapor barrier layer has a moisture vapor transmission rate that is lower than that of the second layer. In still another embodiment, the moisture vapor barrier layer has a moisture vapor transmission rate that is lower than that of the first layer and the second layer. Alternatively, the thin moisture vapor barrier layer may comprise a moisture vapor transmission rate in the range of from about 0.45 to about 0.95 grams·mm/m²·day.

The thin moisture vapor barrier layer may further comprise a filler in an amount of from about 0.1 weight percent (wt. %) to about 20 wt. %. The filler may comprise at least one of flakes, fibers and platelets. In one embodiment, the platelets are at least partially exfoliated. The filler may be selected from the group consisting of natural, synthetic and modified silicates.

The monovalent cation may be selected from the group consisting of Na, Li, and K, for example.

In another embodiment, a golf ball of the invention comprises: a first layer; and a thin moisture vapor barrier layer having a thickness of less than about 0.010 in. disposed concentrically about a spherical outer surface of the first layer. The thin moisture vapor barrier layer is formed from an ionomer composition consisting of a 1-50 percent aqueous mono-valent high acid ionomer dispersion. The ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10' as measured by ASTM D1238 at 190° C. using a 2160 g load. In one embodiment, the moisture vapor barrier layer has a moisture vapor transmission rate in the range of from about 0.45 to about 0.95 grams·mm/ $m^2$·day. In another embodiment, the thin moisture vapor barrier layer has a moisture vapor transmission rate less than from about 0.45 to about 0.95 grams·mm/$m^2$·day.

In this construction, the thin moisture vapor barrier layer is an outermost golf ball layer. In one embodiment, the thin moisture vapor barrier layer comprises a cover. In another embodiment, the first layer comprises a cover and the thin moisture vapor barrier layer comprises a coating layer disposed concentrically about the cover layer.

The invention also relates to a golf ball formed from the steps comprising: providing a first layer; forming a thin moisture vapor barrier layer having a thickness of less than about 0.010 in. concentrically about a spherical outer surface of the first layer; and forming a second layer concentrically about a spherical outer surface of the thin moisture vapor barrier layer; wherein (a) the thin moisture vapor barrier layer is formed from an ionomer composition consisting of a 1-50 percent aqueous mono-valent high acid ionomer dispersion; (b) the ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load; and (c) the thin moisture vapor barrier layer has a moisture vapor transmission rate that is lower than that of the first layer.

In a different embodiment, the invention is directed to a golf ball formed from the steps comprising: providing a first layer; and forming a thin moisture vapor barrier layer having a thickness of less than about 0.010 in. concentrically about a spherical outer surface of the first layer; wherein (a) the thin moisture vapor barrier layer is formed from an ionomer composition consisting of a 1-50 percent aqueous mono-valent high acid ionomer dispersion; (b) the ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load; and (c) the thin moisture vapor barrier layer has a moisture vapor transmission rate in the range of from about 0.45 to about 0.95 grams·mm/$m^2$·day.

Meanwhile, the invention is directed to a method of making a golf ball comprising: providing a first layer; forming a thin moisture vapor barrier layer having a thickness of less than about 0.010 in. concentrically about a spherical outer surface of the first layer; and forming a second layer concentrically about a spherical outer surface of the thin moisture vapor barrier layer; wherein: (a) the thin moisture vapor barrier layer is formed from an ionomer composition consisting of a 1-50 percent aqueous mono-valent high acid ionomer dispersion; (b) the ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load; and (c) the thin moisture vapor barrier layer has a moisture vapor transmission rate that is lower than that of the first layer.

In a different embodiment, the method of making a golf ball of the invention comprises: providing a first layer; forming a thin moisture vapor barrier layer having a thickness of less than about 0.010 in. concentrically about a spherical outer surface of the first layer; wherein: (a) the thin moisture vapor barrier layer is formed from an ionomer composition consisting of a 1-50 percent aqueous mono-valent high acid ionomer dispersion; (b) the ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load; and (c) the thin moisture vapor barrier layer has a moisture vapor transmission rate in the range of from about 0.45 to about 0.95 grams·mm/$m^2$·day.

DETAILED DESCRIPTION

A golf ball of the invention comprises a thin moisture vapor barrier layer having a thickness of less than about 0.010 inches. In some embodiments, the thin moisture vapor barrier layer is disposed between a first layer and a second layer. In other embodiments, the thin moisture vapor barrier layer surrounds the first layer and comprises an outermost layer.

The first layer may comprise any golf ball component such as a core, intermediate layer, cover and/or a coating layer that is disposed about the cover. As used herein, the term "core" refers to either a single piece core or a dual core (inner core portion surrounded by an outer core layer). Meanwhile, an intermediate layer is any golf ball layer disposed between the core and an outermost golf ball layer such as a cover layer.

The thin moisture vapor barrier layer is formed from an ionomer composition consisting of a 1-50 percent aqueous mono-valent high acid ionomer dispersion. The ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10 min. as measured by ASTM D1238 at 190° C. using a 2160 g load.

The term "dispersion" as used herein describes a free-flowing liquid wherein solids are not visible to the human eye. The thin moisture barrier layer of a golf ball of the invention incorporates ionomers which readily form aqueous dispersions when mixed with hot water under low shear conditions rather than requiring significantly more rigorous conditions such as high pressure, high shear, autoclave processes or extrusion processes, etc. and longer time periods to transition into the liquid phase.

The ionomer dispersion may comprise from about 1 wt. % to about 50 wt. % ionomer solids based on the total weight of the ionomer composition. In an alternative embodiment, the ionomer dispersion may comprise from about 5 wt. % to about 30 wt. % ionomer solids based on the total weight of the ionomer composition. In yet another embodiment, the ionomer dispersion may comprise from about 10 wt. % to about 20 wt. % ionomer solids based on the total weight of the ionomer composition.

The neutralizing agents for the thin moisture barrier layer ionomer may be for example, Na, Li, K, or amine-type bases in the form of hydroxides, salts, carbonates, amines, ammonium hydroxides, or mixtures thereof.

In one embodiment, the thin moisture vapor barrier layer has a moisture vapor transmission rate that is lower than that of an adjacent golf ball layer (that is, the first layer and/or second layer). As used herein, the term "moisture vapor transmission rate" is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-94 entitled "Standard Test Method for Water Vapor Transmission Rate of Flexible Barrier Materials Using an Infrared Detection Technique," among others.

In some embodiments, the adjacent layer may be the layer which the thin moisture vapor barrier layer surrounds. In this embodiment, the thin moisture vapor barrier layer may encapsulate and/or envelope the first layer to prevent liquid and/or vapor from penetrating therein.

In other embodiments, the adjacent layer may be a layer that surrounds the thin moisture vapor barrier layer. In such an embodiment, the thin moisture vapor barrier layer may have a moisture vapor transmission rate that is lower than that of a surrounding layer such that liquid and/or vapor may penetrate the surrounding layer but will not penetrate the thin moisture vapor barrier layer.

Non-limiting examples of suitable moisture vapor transmission rates for the thin moisture vapor barrier layer are as follows. In one embodiment, the thin moisture vapor barrier layer may have a moisture vapor transmission rate in the range of from about 0.45 to about 0.95 grams·mm/m$^2$·day. Embodiments are envisioned, however, wherein the moisture vapor transmission rate is less than about 0.45 grams·mm/m$^2$·day. The moisture vapor transmission rate of the thin moisture vapor barrier layer may in one embodiment be less than the moisture vapor transmission rate of conventional ionomer resins such as Surlyn®. Alternative embodiments are envisioned wherein the moisture vapor transmission rate of the thin moisture vapor barrier layer is greater than about 0.95 grams·mm/m$^2$·day by up to about 10% yet is lower than the moisture vapor transmission rate of the layer it encapsulates.

In one embodiment, the thin moisture vapor barrier layer may have a moisture vapor transmission rate that is lower than the moisture vapor transmission rate of each of the first layer and the second layer. This means that any moisture which may penetrate through the second layer will not pass through the interceding thin moisture vapor barrier layer, thereby substantially preventing moisture penetration into the first layer. Embodiments are envisioned, however, wherein the thin moisture vapor barrier layer has a moisture vapor transmission rate that is substantially the same as or even greater than that of the second layer but lower than that of the first layer.

In the present invention, it has been found that no substantial amount of liquid and/or vapor will pass through the interface between the thin moisture vapor barrier layer and the first layer as compared to an untreated first layer when exposed to similar conditions. By encapsulating the first layer in a thin moisture vapor barrier layer as detailed herein, the first layer is protected from liquid and/or vapor. As a result, the optimum properties of such golf balls (for example, high coefficient of restitution) are not substantially reduced when the balls are stored in humid conditions as opposed to golf balls that do not contain the inventive moisture vapor barrier layer. Under standard humidity conditions for testing, the temperature would be in the range of about 100° F. to about 120° F. and the relative humidity would be in the range of about 70% to about 90% for six weeks.

The thin moisture vapor barrier layer in a golf ball of this invention has a thickness of less than about 0.010 inches. In one embodiment, the thin moisture vapor barrier layer has a thickness of less than 0.010 inches. In other embodiments, the thickness of the thin moisture vapor barrier layer may be in the range of from about 0.0001 to about 0.010 inches, or in the range of from about 0.0005 to about 0.005 inches, or in the range of from about 0.001 to about 0.004 inches.

Non-limiting examples of suitable materials for the moisture vapor barrier layer of a golf ball of the invention are set forth in U.S. Pat. No. 8,907,022 of Hayes et al., hereby incorporated by reference herein in its entirety. The thin moisture barrier layer ionomer may be derived from certain parent acid copolymers comprising copolymerized units of ethylene and from about 18 wt. % to about 30 wt. % of copolymerized units of an alpha, beta-ethylenically unsaturated carboxylic acid such as acrylic acid or methacrylic acid. Preferably, the parent acid copolymer used herein comprises about from about 19 wt. % to about 25 wt. %, or from about 19 wt. % to about 23 wt. % of the alpha, beta-ethylenically unsaturated carboxylic acid, based on the total weight of the copolymer.

The alpha, beta-ethylenically unsaturated carboxylic acid may be methacrylic acid. Of note are acid copolymers consisting essentially of copolymerized units of ethylene and copolymerized units of the alpha, beta-ethylenically unsaturated carboxylic acid and 0 wt. % of additional comonomers; that is, dipolymers of ethylene and the alpha, beta-ethylenically unsaturated carboxylic acid. Examples of acid copolymers are ethylene methacrylic acid dipolymers.

The parent acid copolymers may have a melt flow rate (MFR) of greater than 180 g/10 min. as measured by ASTM D1238 at 190° C. using a 2160 g load, or greater than about 180 g/10 min. as measured by ASTM D1238 at 190° C. using a 2160 g load, or of about 200 to about 1000 grams/10 min. as measured by ASTM D1238 @190° C. using a 2160[ ]g load. A similar ISO test is ISO 1133. Alternatively, the parent acid copolymers may have MFR from a lower limit of 200, 250 or 300 to an upper limit of 400, 500, 600 or 2000. The melt flow rate of the parent acid copolymer provides ionomers with optimum physical properties while still allowing for rapid self-dispersion in hot water. Ionomers derived from parent acid copolymers with melt flow rates below about 180 g/10 min. have minimal hot water self-dispersibility, while ionomers derived from parent acid copolymer melt flow rates of greater than about 1000 g/10 min. may reduce the physical properties in the thin moisture barrier layer.

In some embodiments, blends of two or more ethylene acid copolymers may be used, provided that the aggregate components and properties of the blend fall within the limits described above for the ethylene acid copolymers. For example, two ethylene methacrylic acid dipolymers may be used such that the total weight % of methacrylic acid is from about 18 wt. % to about 30 wt. % of the total polymeric material and the melt flow rate of the blend is from about 180 g/10 min. to about 1000 g/10 min.

The ionomers of the ionomer composition (forming thin moisture vapor barrier layer) are produced from the parent acid copolymers, wherein from about 45% to about 70%, or from about 55% to about 60%, such as about 60%, of the total carboxylic acid groups of the parent acid copolymers, as calculated for the non-neutralized parent acid copolymers, are neutralized to form carboxylic acid salts with sodium ions. The parent acid copolymers may be neutralized using methods disclosed in, for example, U.S. Pat. No. 3,404,134. Embodiments are also envisioned, however, wherein greater than about 50% of the total carboxylic acid groups of the parent acid copolymers, as calculated for the non-neutralized parent acid copolymers, are neutralized to form carboxylic acid salts with sodium ions.

The ionomers of the ionomer composition (forming the thin moisture barrier layer) combine the properties of being self-dispersible in hot water along with being thermoplastic, allowing for these compositions to form a thin moisture barrier layer about the outer surface of a golf ball component by contacting the outer surface with the ionomer composition via dipping, spraying, etc, solving and addressing the prior problems associated with incorporating ionomeric materials in golf ball constructions in thin layers.

The ionomers of the ionomer composition (forming the thin moisture barrier layer) have a melt flow rate (MFR) of at least 1 g/10 min, such as about 1 to about 20 g/10 min. as measured by ASTM D1238 at 190° C. using a 2160 g load, or of from about 1 g/10 min. to about 10 g/10 min, or of from about 1 g/10 min. to about 5 g/10 min. The combination of the above described parent acid copolymer melt flow rates and the sodium neutralization levels provides ionomers which combine the properties of being easily self-dispersible in hot water and easily formed into a very thin moisture barrier layer of about 0.010 inches or less about the first layer.

In some embodiments, blends of two or more ionomers may be used, provided that the aggregate components and properties of the blend fall within the limits described above for the ionomers.

The aqueous mono-valent high acid ionomer dispersion may also contain additives and/or fillers known in the art, which may be added to the ionomer(s) before the dispersion is formed via polymer compounding such a extrusion or milling followed by pelletizing, or added directly into the ionomer dispersion under high shear conditions to ensure dispersion and exfoliation of the filler.

The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, surfactants, chelating agents, and coupling agents, wetting agents, coloring agents, optical brighteners, whitening agents such as titanium dioxide and zinc oxide, UV absorbers, hindered amine light stabilizers, defoaming agents, processing aids, surfactants, antioxidants, stabilizers, softening agents, plasticizers, impact modifiers, foaming agents, density-adjusting fillers, reinforcing materials, and compatibilizers.

The density-adjusting fillers can be added to modify the modulus, tensile strength, and other properties of the compositions. Examples of useful fillers include tungsten, zinc oxide, barium sulfate, calcium oxide, calcium carbonate, silica, and zinc carbonate. Generally, the additives will be present in the composition in an amount between about 1 wt. % and about 70 wt. % based on the total weight of the composition depending upon the desired properties.

The addition of hydrophobic microparticles such as fibers; whiskers; metal flakes; micaceous particles or nanoparticles to the ionomer dispersion creates a tortuous (random or non-linear) path across the layer reducing its moisture vapor transmission rate. The term microparticles refers to particulates having a particle size of about 1 micron to about 200 microns. Nanoparticles refer to particles having an average particle size less than 1 micron. Suitable microparticles and nanoparticles can be pigmented or non-pigmented, and include fibers, whiskers, and flaked metals such as aluminum flakes, iron oxide flakes, copper flakes, bronze flakes, and the like, and mixtures thereof. Preferred metal flakes include aluminum flakes and, more specifically, aluminum oxide flakes. Microparticles sized preferably about 5 microns to about 50 microns may be used. The aspect ratio of the flakes preferably may be about 50 to about 10,000.

Platelet-type fillers that are generally at least partially exfoliated (partially or completely) maximize barrier properties. Examples of other fillers that create a tortuous path or physical barrier for the water vapor or other gases include natural, synthetic or modified silicates. Examples of filler level in the ionomer composition include from about 0.1% to about 20%, or from about 0.5% to about 15%, or about 1.0% to about 10%, and may include one or more filler types.

The aqueous mono-valent high acid ionomer dispersion may further contain additives such as polyethylene glycol, waxes, bis-stearamide, minerals, and phthalate compounds. The aqueous mono-valent high acid ionomer dispersion may include stiffening agents as well.

In addition, the aqueous mono-valent high acid ionomer dispersion may include at least one fatty acid or salt thereof. The fatty acid is selected preferably from the group of stearic acid, behenic acid, erucic acid, oleic acid, linoelic acid, and dimerized derivatives, and mixtures thereof. In one version, the fatty acid or salt is added to the master batch prior to mixing the master batch with the ethylene acid copolymer. In another version, the fatty acid or salt is added after the master batch and ethylene acid copolymer have been mixed.

There are numerous suitable methods for preparing the aqueous mono-valent high acid ionomer dispersion. In one embodiment, the ionomer may be added to room temperature water under low shear conditions and then the temperature of the water slowly raised to 80-90° C., increasing mixer speed as viscosity increases until all of the ionomer composition is dispersed. In another embodiment, the ionomer is slowly added to water that is pre-heated to a temperature of 80° C.-90° C. under low shear conditions and mixing is continued until the dispersion is formed.

An excellent dispersion may be achieved when the ionomer and filler are pre-mixed together under high shear before dissolving in heated water. In another embodiment, may be added directly to the already formed dispersion under high shear conditions to ensure dispersion and exfoliation of the filler.

Blends of acid copolymers can be used as long as the blend melt index is >180 g/10 min. For example, an acid co-polymer with a melt index of 150 g/10 min. can be blended with an acid co-polymer having a melt index of 300 g/10 min. at an appropriate ratio to ensure that the blend has a MI>180 g/10 min. Meanwhile, of course, the acid level should be greater than 18%.

Then, thin moisture vapor barrier layer may be formed about the first layer by exposing the outer surface of the first layer to the ionomer composition (aqueous mono-valent high acid ionomer dispersion) or otherwise contacting that outer surface therewith. The thin moisture vapor barrier layer can be created by such methods as dipping the outer surface in the aqueous mono-valent high acid ionomer dispersion, or spraying the outer surface therewith, for example. The outer surface may be at room temp when dipped, sprayed or otherwise contacted with the aqueous mono-valent high acid ionomer dispersion. Alternatively, heating the outer surface before or after exposing the outer surface to the dispersion may facilitate drying and formation of the thin moisture barrier layer about the first layer.

The dispersion itself can be used at room temperature, or at an elevated temperature or any combination of the two. During over-molding of additional layers (such as the second layer) about the thin moisture vapor barrier layer, the thin high acid ionomer composition will advantageously re-melt and form strong bonds/interactions with the first and second layers.

After the thin moisture vapor barrier layer is formed about the first layer, any second layer may be formed/applied about the moisture vapor barrier layer. The second layer encapsulates the moisture barrier layer. The second layer may be applied by any suitable technique injection molding, compression molding, casting, reaction injection molding (RIM), thermoplastic injection molding, vacuum forming, powder coating, and the like. Normally, compression and injection molding techniques are used to make thermoplastic second layers, while RIM, liquid injection molding, and casting are used to make thermoset second layers, although it is contemplated that any method known in the art for forming a layer about a moisture vapor barrier layer suffice.

For example, in a casting process, a polyurethane and/or polyurea composition may be dispensed into the cavity of an upper mold member. This first mold half has a hemispherical structure. Then, the cavity of a corresponding lower mold member is filled with the polyurea mixture. This second mold half also has a hemispherical structure. A ball cup holds the golf ball (core and overlying casing layer) under vacuum. After the polyurea mixture in the first mold half has reached a semi-gelled or gelled sate, the pressure is removed and the golf ball is lowered into the upper mold half containing the polyurea mixture. Then, the first mold half is inverted and mated with the second mold half containing polyurea mixture which also has reached a semi-gelled or gelled state. The polyurea mixtures, contained in the mold members that are mated together, form the golf ball cover. The mated first and second mold halves containing the polyurea mixture and golf ball center may be next heated so that the mixture cures and hardens. Then, the golf ball is removed from the mold and allowed to cool as needed.

A polyurethane or polyurea second layer may be disposed immediately about the thin ionomeric moisture vapor barrier layer so that the two are contiguous with each other. A second layer applied over or formed about the thin ionomeric moisture vapor barrier layer helps enhance the sealing effect. This combination of second layer and thin moisture vapor barrier layer further enhances the sealing of the first layer of the ball. In effect, in such an embodiment, the composite structure of the second layer and thin ionomeric moisture vapor barrier layer provides a tight seal. There is a tight interface between the second layer and the thin ionomeric moisture vapor barrier layer as well as between the first layer and thin ionomeric moisture vapor barrier layer. Moisture penetration into the center of the ball is substantially minimized by this seal.

In a golf ball of the invention, the first layer may comprise any golf ball component capable of being surrounded by the thin moisture barrier layer, including for example the core, an intermediate layer and even a cover layer or coating layer formed about the cover. In some embodiments the thin moisture barrier layer is the outermost golf ball layer, whereas in alternate embodiments, the thin moisture barrier layer is intermediate between the first layer and a second layer. In embodiment wherein a second layer surrounds the thin moisture barrier layer, the second layer may comprise an intermediate layer, cover layer or coating layer.

Golf balls made in accordance with this invention can be of any size, although the USGA requires that golf ball used in competition have a diameter of at least 1.68 inches and a weight of no greater than 1.62 ounces. For play outside of USGA competition, the golf balls can have smaller diameters and be heavier. For example, the diameter of the golf ball may be in the range of about 1.62 to about 1.80 inches.

Meanwhile, the diameters and thicknesses of each golf ball layer may be selected and coordinated as known in the art for targeting and achieving desired playing characteristics or feel. For example, the core may have a diameter of from about 1.47 inches (in.) to about 1.62 in.; the intermediate/casing layer may have a thickness of from about 0.025 in. to about 0.090 in.; a core and intermediate/casing layer, combined, may have a diameter of from about 1.52 in. to about 1.65 in.; the cover may have a thickness of from about 0.015 in. to about 0.090 in.; and any coating layers may have a combined thickness of from about 0.1 μm to about 100 μm, or from about 2 μm to about 50 μm, or from about 2 μm to about 30 μm. Meanwhile, each coating layer may have a thickness of from about 0.1 μm to about 50 μm, or from about 0.1 μm to about 25 μm, or from about 0.1 μm to about 14 μm, or from about 2 μm to about 9 μm, for example.

A golf ball of the invention beneficially incorporates a thin moisture vapor barrier layer that may be formed using ionomers such as Ex. 1, Ex. 2, Ex. 3, and Ex. 4 of TABLE I below rather than ionomers such as C1, C2, C3, C5 or non-neutralized acid copolymer C4. These examples collectively demonstrate the advantageous relationship of acid level and melt index of the acid copolymer and the neutralization of the ionomer material for forming aqueous dispersions.

TABLE I

| Example | Acid Copolymer (AC) | | | | Water Dispersability | |
|---|---|---|---|---|---|---|
| | Type | % Methacrylic Acid | MFR (g/10 min) | Weight % Neutralization (Na) | At 80° C. | At 90° C. |
| C1 | AC-1 | 15 | 200 | 51 | — | No |
| C2 | AC-1 | 15 | 200 | 70 | — | No |
| C3 | AC-3 | 19 | 60 | 50 | — | No |
| C4 | AC-2 | 19 | 400 | 0 (non-ionomer) | — | No |
| C5 | AC-2 | 19 | 400 | 40 | — | No |
| Ex 1 | AC-4 | 19 | 250 | 60 | Yes | Yes |
| Ex 2 | AC-5 | 23 | 270 | 55 | — | Yes |
| Ex 3 | AC-2 | 19 | 400 | 50 | No | Yes |
| Ex 4 | AC-2 | 19 | 400 | 60 | Yes | Yes |

Referring to TABLE I, ionomers were produced from ethylene methacrylic acid copolymer base resins having a melt index range of 60 to 400 g/10' and a wt. % of methacrylic acid of 15 to 23%. The ionomers were neutralized with sodium hydroxide and percent neutralization levels were zero to 70%.

The examples illustrate the addition of non-neutralized acid copolymer (example C4) or ionomers to heated water using the following procedure to produce a 10 wt. % solid loading. Into a metal vessel is added an appropriate amount of distilled water. The vessel is slowly heated to the described temperature, and slow agitation is provided with an overhead paddle mixer. When the water reaches the desired temperature, the resin is added in one portion and the resulting mixture is stirred for a total of 20 minutes. The mixture is allowed to cool, and materials that formed dispersions with no visible solids are denoted as "yes" and materials that did not form a dispersion are denoted as "no" in TABLE I.

TABLE I indicates that ionomers prepared from acid copolymer with 15 wt. % methacrylic acid and a melt index of 200 g/10' did not form an aqueous dispersion using this described procedure even at higher levels of neutralization (comparative examples C1 and C2). Comparative example C3, produced from acid copolymers comprising about 19 wt. % methacrylic acid and a melt index of 60 g/10', also did not yield a dispersion despite being neutralized to a level of 50%.

Ionomers Ex. 3 and Ex. 4 involved an acid copolymer with the same wt. % of methacrylic acid of 19% but with a higher melt flow of 400 g/10' in the base resin and both produced good dispersions when neutralized to 50 and 60%. Ionomers with neutralization levels of 40% or less did not form dispersions, even when formed from an acid copolymer comprising about 19 wt. % methacrylic acid and having a melt index of 400 g/10' (Comparative examples C4 and C5). Dispersions were also easily produced from ionomers Ex. 1 and Ex. 2, further demonstrating the advantageous relationship of acid level and melt index of the acid copolymer and the neutralization of the ionomer material for forming aqueous dispersions.

A core layer in a golf ball of the invention, whether comprising a first or second layer, may be solid, semi-solid, fluid-filled, or hollow, and the core may have a single-piece or multi-piece structure. A variety of materials may be used to make the core including thermoset compositions such as rubber, styrene butadiene, polybutadiene, isoprene, polyisoprene, trans-isoprene; thermoplastics such as ionomer resins, polyamides or polyesters; and thermoplastic and thermoset polyurethane and polyurea elastomers. In one embodiment, the core is a single-piece made from a natural or synthetic rubber composition such as polybutadiene. In other instances, a two-piece core is constructed; that is, there may be two core layers. For example, an inner core portion may be made of a first base rubber material and an outer core layer, which surrounds the inner core, may be made of a second base rubber material. The respective core pieces may be made of the same or different rubber materials. Cross-linking agents and fillers may be added to the rubber materials.

More particularly, materials for solid cores typically include compositions having a base rubber, a filler, an initiator agent, and a cross-linking agent. The base rubber typically includes natural or synthetic rubber, such as polybutadiene rubber. In one embodiment, the base rubber is 1,4-polybutadiene having a cis-structure of at least 40%. The polybutadiene can be blended with other elastomers such as natural rubber, polyisoprene rubber, styrene-butadiene rubber and/or other polybutadienes. Another suitable rubber that may be used in the core is trans-polybutadiene. This polybutadiene isomer is formed by converting the cis-isomer of the polybutadiene to the trans-isomer during a molding cycle. A soft and fast agent such as pentachlorothiophenol (PCTP) or ZnPCTP can be blended with the polybutadiene. These compounds may also function as cis-to-trans catalyst to convert some cis-1,4 bonds in the polybutadiene into trans 1,4 bonds.

Fillers, which may be used to modify such properties as the specific gravity (density-modifying materials), hardness, weight, modulus, resiliency, compression, and the like may be added to the core composition. Normally, the fillers are inorganic, and suitable fillers include numerous metals or metal oxides, such as zinc oxide and tin oxide, as well as barium sulfate, zinc sulfate, calcium carbonate, barium carbonate, clay, tungsten, tungsten carbide, silica, and mixtures thereof. Fillers may also include various foaming agents or blowing agents, zinc carbonate, regrind (recycled core material typically ground to about 30 mesh or less particle size), high-Mooney-viscosity rubber regrind, and the like. In addition, polymeric, ceramic, metal, and glass microspheres may be used.

In one embodiment, the core is a single-piece core having an outside diameter of about 1.20 to about 1.65 inches. Preferably, the single-piece core has a diameter of about 1.62 inches. The core generally makes up a substantial portion of the ball, for example, the core may constitute at least about 90% of the ball. The hardness of the core may vary depending upon the desired properties of the ball. One non-limiting example of such a construction is as follows. The core may be a single-piece core having a diameter of at least about 1.58 inches; the thin moisture vapor barrier layer may have a thickness of less than about 0.010 inches; and the cover may have a thickness of less than about 0.050 inches.

In another embodiment, the core may include an inner core portion and surrounding outer core layer. This core structure may be referred to as a multi-core or two-piece core. The inner core portion and outer core layer together may be referred to as the "center" of the ball. In such balls having two-piece cores, the inner core portion may have a diameter of about 0.75 to about 1.30 inches, more preferably 1.00 to 1.15 inches, and be relatively soft (that is, it may have a compression of less than about 30.) Meanwhile, the outer core layer may have a thickness of about 0.20 to about 0.60 inches and be relatively hard (compression of about 70 or greater). That is, the two-piece core or "center" of the ball, which constitutes the inner core and outer core layer, may have a total diameter of about 1.50 to about 1.64 inches, more preferably 1.510 to 1.620 inches, and a compression of about 80 to about 115, more preferably 85 to 110.

In one instance, the core is a two-piece core having a total diameter of about 1.32 inches to about 1.62 inches and comprising an inner core portion having a diameter of about 0.90 inches to about 1.20 inches, and an outer core portion having a thickness of about 0.21 to about 0.36 inches. In such a construction, the thin moisture vapor barrier layer has a thickness of less than about 0.010 inches, and the cover preferably has a thickness of less than 0.050 inches, preferably less than about 0.040 inches. More preferably, the cover has a thickness of about 0.015 to 0.040 inches.

The polymers, free-radical initiators, filler, cross-linking agents, and other ingredients may be mixed together to form the single-piece or multi-piece core using conventional techniques. Particularly, a compression or injection molding process can be used to form the solid spheres that will be used as the core.

The compression of the core portion is generally overall in the range of about 40 to about 110 and more preferably in the range of about 60 to about 100. In general, when the ball contains a relatively soft core, the resulting spin rate of the ball is relatively low. The compressive force acting on the ball is less when a club strikes the ball and compresses the cover against a relatively soft core. The club face does not fully interface and grasp the ball's surface and thus the initial spin rate on the ball is lower. On the other hand, when the ball contains a relatively hard core, the resulting spin rate of the ball is relatively high. As the club face strikes the ball, it is able to more fully interface and grasp the ball's surface and thus the initial spin rate of the ball is higher. In other embodiments, the overall coefficient of restitution ("COR") of cores of the present invention at 125 ft/s is at least 0.750, or at least 0.775 or at least 0.780, or at least 0.785, or at least 0.790, or at least 0.795, or at least 0.800.

Cores are also known to comprise a variety of other materials that are typically also used for intermediate and cover layers. Intermediate layers may likewise also comprise materials generally used in cores and covers as described herein for example.

The cover material should impart durability, toughness and tear-resistance to the ball. For example, polyurethane/polyurea compositions can be used in the cover layer, because they can provide the cover with high durability as well as a soft feel. In other embodiments, the cover may be made of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(ethylene vinyl alcohol), poly(tetrafluoroethylene) and their copolymers including functional comonomers and blends thereof. Preferably, the cover is made from a different polymeric material than the materials used to make the moisture vapor barrier layer. And, the cover has a moisture vapor transmission rate which is greater than the rate of the moisture barrier layer. That is, moisture tends to penetrate through the cover layer at greater rate than moisture penetrates through the barrier layer. In addition, the moisture vapor rate of the core material as described above, by and in itself, has a moisture vapor transmission rate greater than that of the barrier layer.

In one embodiment, ionomer resins may be used as the cover material. These cross-linked polymers contain interchain ionic bonding as well as covalent bonding. The ionomer resins include, for example, a copolymer of ethylene and an acid group such as methacrylic or acrylic acid. Metal ions such as sodium, lithium, zinc, and magnesium are used to neutralize the acid groups in the polymer. Commercially available ionomer resins are known in the industry and include numerous resins sold under the trademarks, Surlyn® (DuPont) and Escor® and Iotek® (Exxon). These ionomer resins are available in various grades and are identified based on the type of base resin, molecular weight, type of metal ion, amount of acid, degree of neutralization, additives, and other properties.

As discussed above, suitable cover materials include, but are not limited to, ionomer resins and blends thereof (e.g., Surlyn® ionomer resins and DuPont® HPF 1000 and HPF 2000, commercially available from E. I. du Pont de Nemours and Company; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyurethanes; polyureas; copolymers and hybrids of polyurethane and polyurea; polyethylene, including, for example, low density polyethylene, linear low density polyethylene, and high density polyethylene; polypropylene; rubber-toughened olefin polymers; acid copolymers, e.g., (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; ethylene vinyl acetates; ethylene methyl acrylates; polyvinyl chloride resins; polyamides, amide-ester elastomers, and graft copolymers of ionomer and polyamide, including, for example, Pebax® thermoplastic polyether block amides, commercially available from Arkema Inc; crosslinked trans-polyisoprene and blends thereof; polyester-based thermoplastic elastomers, such as Hytrel®, commercially available from E. I. du Pont de Nemours and Company; polyurethane-based thermoplastic elastomers, such as Elastollan®, commercially available from BASF; synthetic or natural vulcanized rubber; and combinations thereof. In a particular embodiment, the cover is a single layer formed from a composition selected from the group consisting of ionomers, polyester elastomers, polyamide elastomers, and combinations of two or more thereof.

In a second embodiment, the cover may comprise a composition formed from a thermoplastic polyurethane, thermoset polyurethane, thermoplastic polyurea, or thermoset polyurea. More particularly, a polyurea composition can be used as the cover layer. In another version, the cover layer comprises a blend of from about 10% to about 90% by weight of the polyurea composition and from about 90% to about 10% of a polyurethane composition. In yet another embodiment, the cover layer comprises a blend of from about 10% to about 90% by weight of the polyurea composition and from about 90% to about 10% of another polymer or other material such as vinyl resins, polyesters, polyamides, and polyolefins.

Polyurethanes, polyureas, and blends and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

Polyurethane cover compositions that can be used include those formed from the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, that is, as part of a prepolymer and in the curing agent. The curing agent includes a polyol curing agent preferably selected from the group consisting of ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(.beta.-hydroxyethyl)ether; hydroquinone-di-(.beta.-hydroxyethyl)ether; trimethylol propane; and combinations thereof.

Suitable polyurethane cover compositions also include those formed from the reaction product of at least one isocyanate and at least one curing agent or the reaction product of at least one isocyanate, at least one polyol, and at least one curing agent. Preferred isocyanates include those selected from the group consisting of 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, and combinations thereof. Preferred polyols include those selected from the group consisting of polyether polyol, hydroxy-terminated polybutadiene, polyester polyol, polycaprolactone polyol, polycarbonate polyol, and combinations thereof. Preferred curing agents include polyamine curing agents, polyol curing agents, and combinations thereof. Polyamine curing agents are particularly preferred. Preferred polyamine curing agents include, for example, 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); and combinations thereof.

The cover composition is not limited by the use of a particular polyisocyanate. Suitable polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("H.sub.12MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate; and combinations thereof. Polyisocyanates are known to those of ordinary skill in the art as having more than one isocyanate group, e.g., di-, tri-, and tetra-isocyanate. Preferably, the polyisocyanate is selected from MDI, PPDI, TDI, and combinations thereof. More preferably, the polyisocyanate includes MDI. It should be understood that, as used herein, the term "MDI" includes 4,4'-diphenylmethane diisocyanate, polymeric MDI, carbodiimide-modified liquid MDI, combinations thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate may have less than 14% unreacted NCO groups. Preferably, the at least one polyisocyanate has no greater than 8.5% NCO, more preferably from 2.5% to 8.0%, or from 4.0% to 7.2%, or from 5.0% to 6.5%.

The cover composition is not limited by the use of a particular polyol. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Particularly preferred are polytetramethylene ether glycol ("PTMEG"), polyethylene propylene glycol, polyoxypropylene glycol, and combinations thereof. The hydrocarbon chain can have saturated or unsaturated bonds and substituted or unsubstituted aromatic and cyclic groups. Preferably, the polyol includes PTMEG. Suitable polyester polyols include, but are not limited to, polyethylene adipate glycol, polybutylene adipate glycol, polyethylene propylene adipate glycol, ortho-phthalate-1,6-hexanediol, and combinations thereof. The hydrocarbon chain can have saturated or unsaturated bonds, or substituted or unsubstituted aromatic and cyclic groups. Suitable polycaprolactone polyols include, but are not limited to 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and combinations thereof. The hydrocarbon chain can have saturated or unsaturated bonds, or substituted or unsubstituted aromatic and cyclic groups. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of polyurethane compositions and have been found to improve cut, shear, and impact resistance of the resultant balls. Preferred polyamine curatives include, but are not limited to 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and combinations thereof. Preferably, the curing agent includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy) ethoxy]ethoxy}benzene; 1,4-butanediol; 1,5-pentanediol; 1,6-hexanediol; resorcinol-di- (4-hydroxyethyl)ether; hydroquinone-di-(4-hydroxyethyl) ether; and combinations thereof. Preferred hydroxy-terminated curatives include ethylene glycol; diethylene glycol; 1,4-butanediol; 1,5-pentanediol; 1,6-hexanediol, trimethylol propane, and combinations thereof. Preferably, the hydroxy-terminated curative has a molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent. One commonly employed method, known in the art as a one-shot method, involves concurrent mixing of the polyisocyanate, polyol, and curing agent. This method results in a mixture that is inhomogeneous (more random) and affords the manufacturer less control over the molecular structure of the resultant composition. A preferred method of mixing is known as a pre-polymer method. In this method, the polyisocyanate and the polyol are mixed separately prior to addition of the curing agent. This method affords a more homogeneous mixture resulting in a more consistent polymer composition.

Suitable polyurethanes are further disclosed, for example, in U.S. Pat. Nos. 5,334,673, 6,506,851, 6,756,436, 6,867,279, 6,960,630, and 7,105,623, the entire disclosures of which are hereby incorporated herein by reference. Suitable polyureas are further disclosed, for example, in U.S. Pat. Nos. 5,484,870 and 6,835,794, and U.S. Patent Application No. 60/401,047, the entire disclosures of which are hereby incorporated herein by reference. Suitable polyurethane-urea cover materials include polyurethane/polyurea blends and copolymers comprising urethane and urea segments, as disclosed in U.S. Patent Application Publication No. 2007/0117923, the entire disclosure of which is hereby incorporated herein by reference.

Cover compositions may include one or more filler(s), such as coloring agents, fluorescent agents, whitening agents, antioxidants, dispersants, UV absorbers, light stabilizers, plasticizers, surfactants, compatibility agents, foaming agents, reinforcing agents, release agents, and the like.

Suitable cover materials and constructions also include, but are not limited to, those disclosed in U.S. Patent Application Publication No. 2005/0164810, U.S. Pat. Nos. 5,919,100, 6,117,025, 6,767,940, and 6,960,630, and PCT Publications WO00/23519 and WO00/29129, the entire disclosures of which are hereby incorporated herein by reference.

The golf ball of this invention may have single-, dual-, or multi-layered covers preferably having an overall thickness within a range having a lower limit of 0.010 or 0.020 or 0.025 or 0.030 or 0.040 or 0.045 inches and an upper limit of 0.050 or 0.060 or 0.070 or 0.075 or 0.080 or 0.090 or 0.100 or 0.150 or 0.200 or 0.300 or 0.500 inches. In one embodiment, the cover is a single layer having a thickness of from 0.025 inches to 0.035 inches.

The cover hardness may be targeted depending on desired playing characteristics. As a general rule, when the ball has a relatively soft cover, the initial spin rate of the ball is relatively high and when the ball has a relatively hard cover, the initial spin rate of the ball is relatively low.

In the present invention, "compression" is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Cores having a very low stiffness will not cause the spring to deflect by more than 1.25 mm and therefore have a zero compression measurement. The Atti compression tester is designed to measure objects having a diameter of 1.680 inches; thus, smaller objects, such as golf ball cores, must be shimmed to a total height of 1.680 inches to obtain an accurate reading. Conversion from Atti compression to Riehle (cores), Riehle (balls), 100 kg deflection, 130-10 kg deflection or effective modulus can be carried out according to the formulas given in J. Dalton.

In a golf ball if the invention, Coefficient of Restitution or COR is determined according to a known procedure, wherein a golf ball or golf ball subassembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. COR is then calculated as the ratio of the outgoing transit time period to the incoming transit time period, $COR=V_{out}/V_{in}=T_{in}/T_{out}$. The COR value can be targeted, for example, by varying the core peroxide and antioxidant types and amounts as well as the cure temperature and duration.

The surface hardness of a golf ball layer is obtained from the average of a number of measurements taken from opposing hemispheres, taking care to avoid making measurements on the parting line of the core or on surface defects such as holes or protrusions. Hardness measurements are made pursuant to ASTM D-2240 "Indentation Hardness of Rubber and Plastic by Means of a Durometer." Because of the curved surface of the golf ball layer, care must be taken to ensure that the golf ball or golf ball subassembly is centered under the durometer indentor before a surface hardness reading is obtained. A calibrated digital durometer, capable of reading to 0.1 hardness units, is used for all hardness measurements. The digital durometer must be attached to and its foot made parallel to the base of an automatic stand. The weight on the durometer and attack rate conforms to ASTM D-2240. It should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other.

It is understood that the golf balls of the invention incorporating a thin ionomeric moisture vapor barrier layer as described and illustrated herein represent only some of the many embodiments of the invention. It is appreciated by those skilled in the art that various changes and additions can be made to such golf balls without departing from the spirit and scope of this invention. It is intended that all such embodiments be covered by the appended claims.

It is contemplated that "indicia" may be incorporated in golf balls of the invention. The term "indicia" is considered to mean any symbol, letter, group of letters, design, or the like, that can be added to a layer or surface of the golf ball.

It will be appreciated that any known dimple pattern may be used with any number of dimples having any shape or size. For example, the number of dimples may be 252 to 456, or 330 to 392 and may comprise any width, depth, and edge angle. The parting line configuration of said pattern may be either a straight line or a staggered wave parting line (SWPL).

In any of these embodiments the single-layer core may be replaced with a 2 or more layer core wherein at least one core layer has a hardness gradient. A hardness gradient may exist within and/or between golf ball layers.

Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

Although the golf ball of the invention has been described herein with reference to particular means and materials, it is to be understood that the invention is not limited to the particulars disclosed and extends to all equivalents within the scope of the claims.

What is claimed is:

1. A golf ball comprising:
   a core; a first layer, disposed concentrically about the core;
   a thin moisture vapor barrier layer having a thickness of less than about 0.010 in. and disposed concentrically about a spherical outer surface of the first layer; and
   a second layer disposed concentrically about a spherical outer surface of the thin moisture vapor barrier layer;
   wherein the first layer comprises an inner cover layer, the thin moisture vapor barrier layer comprises a second inner cover layer, and the second layer comprises an outer cover layer;
   wherein the first layer is formed from an ionomeric composition that has a moisture vapor transmission rate that is higher than that of the thin moisture vapor barrier layer;
   wherein the thin moisture vapor barrier layer is formed from an ionomer composition consisting of a 1-50 percent aqueous mono-valent high acid ionomer dispersion; and
   wherein the ionomer of the ionomer composition: (i) has an acid level greater than 18%; (ii) has more than 45% of acid groups that are neutralized with a monovalent cation; and (iii) is formed from an acid copolymer having a starting melt index of greater than 180 g/10' as measured by ASTM D1238 at 190° C. using a 2160 g load.

2. The golf ball of claim 1, wherein the core comprises polybutadiene.

3. The golf ball of claim 2, wherein the second layer comprises a polyurethane composition.

4. The golf ball of claim 1, wherein the thin moisture vapor barrier layer has a moisture vapor transmission rate in the range of from about 0.45 to about 0.95 grams·mm/m$^2$ day.

5. The golf ball of claim 1, wherein the thin moisture vapor barrier layer further comprises a filler in an amount of from about 0.1 wt. % to about 20 wt. %.

6. The golf ball of claim 5, wherein the filler comprises at least one of flakes, fibers and platelets.

7. The golf ball of claim 6, wherein the filler comprises platelets and the platelets are at least partially exfoliated.

8. The golf ball of claim 5, wherein the filler is selected from the group consisting of natural, synthetic and modified silicates.

9. The golf ball of claim 1, wherein the monovalent cation is selected from the group consisting of Na, Li, and K.

10. The golf ball of claim 1, wherein the moisture vapor barrier layer has a moisture vapor transmission rate that is lower than that of the second layer.

* * * * *